US012812707B2

(12) United States Patent
Chen et al.

(10) Patent No.: US 12,812,707 B2
(45) Date of Patent: Nov. 24, 2026

(54) DUAL-TRANSCEIVER BASED ELECTRONIC DEVICES

(71) Applicant: Hewlett-Packard Development Company, L.P., Spring, TX (US)

(72) Inventors: Chung-Chun Chen, Taipei (TW); Yi-Jin Lee, Taipei (TW); Yao Cheng Yang, Taipei (TW); Min-Hsu Chuang, Taipei (TW); Dylan Liu, Taipei (TW); Chien-Pai Lai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 221 days.

(21) Appl. No.: 18/691,732

(22) PCT Filed: Oct. 13, 2021

(86) PCT No.: PCT/US2021/054652
§ 371 (c)(1),
(2) Date: Mar. 13, 2024

(87) PCT Pub. No.: WO2023/063935
PCT Pub. Date: Apr. 20, 2023

(65) Prior Publication Data
US 2024/0397566 A1 Nov. 28, 2024

(51) Int. Cl.
*H04W 76/14* (2018.01)
*H04W 48/16* (2009.01)

(52) U.S. Cl.
CPC ........... *H04W 76/14* (2018.02); *H04W 48/16* (2013.01)

(58) Field of Classification Search
CPC .............................. H04W 76/14; H04W 48/16
See application file for complete search history.

(56) References Cited

U.S. PATENT DOCUMENTS

| | | | | |
|---|---|---|---|---|
| 7,925,212 | B2 | 4/2011 | Eisenbach | |
| 9,143,890 | B2 | 9/2015 | Jose et al. | |
| 9,294,983 | B2 | 3/2016 | Kidron et al. | |
| 9,820,323 | B1 * | 11/2017 | Young | H04W 4/80 |
| 2002/0197998 | A1 | 12/2002 | Schmidt | |
| 2010/0120362 | A1 | 5/2010 | Walley et al. | |
| 2013/0094600 | A1 | 4/2013 | Beziat et al. | |
| 2013/0295927 | A1 | 11/2013 | Ekici et al. | |

(Continued)

FOREIGN PATENT DOCUMENTS

WO 2019/005380 A1 1/2019

*Primary Examiner* — David Bilodeau
(74) *Attorney, Agent, or Firm* — Quarles & Brady LLP

(57) ABSTRACT

In an example, an electronic device may include a network interface device having a first transceiver to communicate via a short-range wireless communication protocol and a second transceiver to communicate via the short-range wireless communication protocol. Further, the electronic device may include a processor connected to the network interface device. During operation, the processor may receive a request to search a first device in accordance with the short-range wireless communication protocol. Further, the processor may search a first radio frequency channel via the first transceiver to detect the first device. Furthermore, the processor may search a second radio frequency channel via the second transceiver to detect the first device. The first radio frequency channel and the second radio frequency channel may be searched in parallel.

15 Claims, 3 Drawing Sheets

(56) References Cited

U.S. PATENT DOCUMENTS

| | | | | |
|---|---|---|---|---|
| 2014/0273858 | A1 | 9/2014 | Panther et al. | |
| 2016/0227351 | A1* | 8/2016 | Gu | H04B 1/44 |
| 2016/0227354 | A1* | 8/2016 | Zhao | H04W 4/80 |
| 2017/0272270 | A1* | 9/2017 | Gu | H04L 12/2838 |
| 2019/0132795 | A1* | 5/2019 | Peavey | H04W 84/18 |
| 2019/0306905 | A1 | 10/2019 | Lin et al. | |

* cited by examiner

DUAL-TRANSCEIVER BASED ELECTRONIC DEVICES

BACKGROUND

Electronic devices such as notebook computers, multimedia players. smartphones, tablet computers, or the like may have an ability to communicate with various other devices over a short-range wireless communication protocol. An example short-range wireless communication protocol is a Bluetooth™ communication protocol. Bluetooth technology is a wireless technology standard that can be used to exchange data over relatively short distances (e.g., within 15 meters). Bluetooth technology may use a dedicated frequency range (e.g., between 2.4 GHz and 2.485 GHz) to send and receive signals between Bluetooth compatible devices (e.g., smartphones, tablet computers, Internet of Things (IoT) devices, automobile computer systems, headsets, wearable devices, and the like). Bluetooth devices broadcast identification signals that may be used to identify or detect the Bluetooth devices within a range of another Bluetooth device and/or pair Bluetooth devices with one another to secure a dedicated communication path between the Bluetooth devices.

BRIEF DESCRIPTION OF THE DRAWINGS

Examples are described in the following detailed description and in reference to the drawings, in which.

DETAILED DESCRIPTION

Figure 1A:
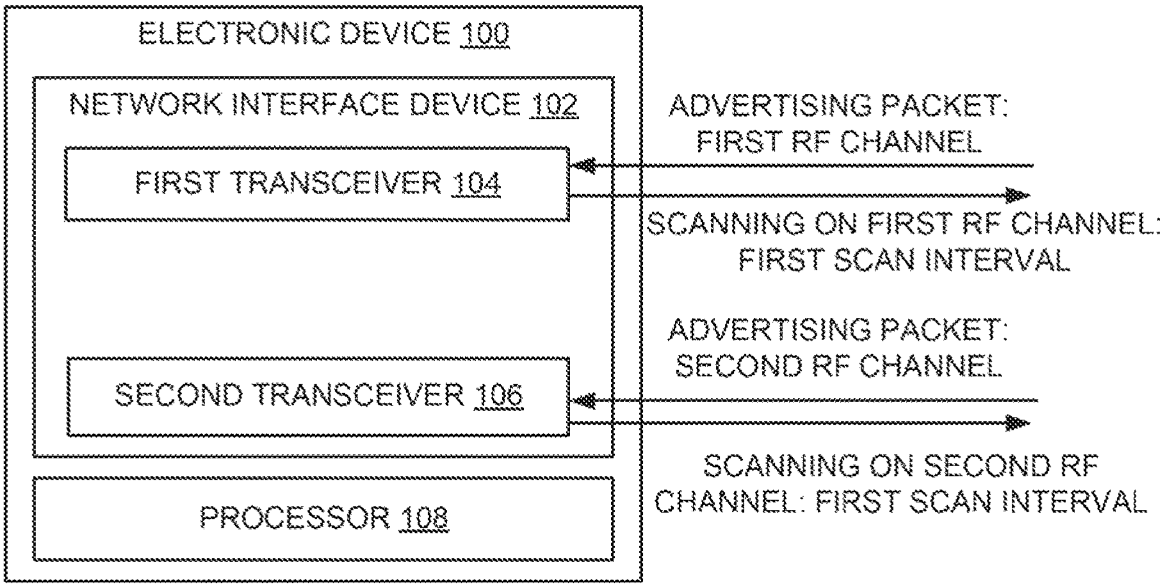
FIG. 1A is a block diagram of an example electronic device, including a processor to search a first radio frequency channel and a second radio frequency channel via a first transceiver and a second transceiver, respectively.

Electronic devices such as notebook computers, multimedia players, smartphones, tablet computers, or the like may have an ability to communicate with various other devices over a short-range wireless communication protocol. An example short-range wireless communication protocol may be a Bluetooth™ communication protocol. According to the Bluetooth communication protocol, an electronic device may perform periodic scans to detect trusted Bluetooth devices within a range (e.g., within 15 meters). Upon detecting a Bluetooth device, a connection may be established with the Bluetooth device to perform command or data transfer. In such examples, the electronic device may have to first complete the scanning of Bluetooth classic channels before initiating scanning of Bluetooth low energy channels, or vice versa, to detect the trusted Bluetooth devices. In this example, the electronic device may utilize a Bluetooth transceiver to sequentially perform scanning of the Bluetooth classic channels and then the Bluetooth low energy channels, or vice versa, which can consume a significant amount of time to complete the scanning of the Bluetooth channels (i.e., the Bluetooth classic channels and the Bluetooth low energy channels).

Further, the Bluetooth communication protocol may enable the electronic device to perform multiple activities at a same time. In an example, the electronic device may communicate with a first Bluetooth device to perform a real-time activity and to a second Bluetooth device to perform a non-real-time activity. For example, the user can utilize the electronic device to have an audio call (e.g., a real-time data packet transfer) with a Bluetooth headset and transfer a file (e.g., a non-real-time data packet transfer) to a Bluetooth enabled storage device at the same time. In another example, the user can utilize the electronic device to have a music playback (e.g., a non-real-time data packet transfer) with the Bluetooth headset and receive inputs from a Bluetooth mouse/keyboard (e.g., a real-time data packet transfer) at the same time. In such examples, the electronic device may utilize a Bluetooth transceiver to perform the real-time data packet transfer and the non-real-time data packet transfer, which can result in a delay in transmission of the real-time data packets or non-real-time data packets. For example, a transmission process for the non-real-time data packets may delay a transmission process for the real-time data packets, or vice versa. Thus, performing the real-time data packet transfer and the non-real-time data packet transfer via the Bluetooth transceiver may affect the bandwidth of the Bluetooth transceiver.

Furthermore, the electronic devices communicating by means of the Bluetooth communication protocol may run a risk of causing and encountering interference in environments where other wireless technologies are in use. Example other wireless technologies may include a wireless local area network (LAN) and other applications based on the IEEE 802.11 specification. The Bluetooth technology works in the 2.4 GHz frequency range. Since 2.4 GHz frequency is an industrial, scientific, and medical radio band (ISM band), there can be a possibility of interference with other devices working in the same frequency band. In order to avoid using the same channel with wireless fidelity (Wi-Fi) or other applications, the electronic device may periodically perform an adaptive frequency hopping. The Bluetooth communication protocol may enable the communicating electronic devices to agree on which channels to use from the available data communication channels (e.g., 37 channels) during communication. When the electronic device detects an interference on a channel, the electronic device can initiate a channel map update. The adaptive frequency hopping may enable the electronic device to continuously monitor the environment for interference and to continuously change the channel map according to the interference. For example, consider that the electronic device utilizes a Bluetooth transceiver to perform an audio call with the Bluetooth headset (i.e., the real-time data packet transfer) and also utilizes the Bluetooth transceiver to trigger periodic scanning of the data communication channels (e.g., non-real-time data packet transfer) to avoid using a congested channel. In this example, utilizing the Bluetooth transceiver to perform both the real-time data packet transfer and the non-real-time data packet transfer may affect the bandwidth of the Bluetooth transceiver to perform the real-time data packet transfer.

In yet other examples, the electronic device may be connected to multiple Bluetooth devices via the Bluetooth communication protocol. In this example, the electronic device may establish a first connection through a Bluetooth transceiver to a first Bluetooth device (e.g., a mobile phone) for data transfer and establish a second connection through the Bluetooth transceiver to a second Bluetooth device (e.g., a wireless headset) for data transfer. In this example, the electronic device may assume a master role for one of the first and the second connections and assume a slave role for the other one of the first and the second connections. However, such an electronic device utilizing the Bluetooth transceiver may define two power saving mechanisms, i.e., a first power saving mechanism to follow the peer device's power saving mechanism in the slave mode and a second power saving mechanism to ask slave device to follow electronic device's power saving mechanism in the master mode. In such examples, utilizing a single Bluetooth transceiver to perform master mode activities and slave mode activities may delay the data transfer, which can also result in an increased power consumption (e.g., a radio frequency (RF) transmission/reception may consume a significant amount of power due to usage of various other power consuming components such as a processor, memory, and other components).

Examples described herein may provide an electronic device having a network interface device with a dual wireless transceiver. The network interface device may include a first transceiver and a second transceiver. The first transceiver and the second transceiver may communicate via a short-range wireless communication protocol (e.g., a Bluetooth communication protocol). Further, the electronic device may include a processor connected to the network interface device. During operation, the processor may receive a request to search a first device in accordance with the short-range wireless communication protocol. Further, the processor may search a first radio frequency channel (e.g., a Bluetooth classic channel) via the first transceiver to detect the first device. Furthermore, the processor may search a second radio frequency channel (e.g., a Bluetooth low energy channel) via the second transceiver to detect the first device. The first radio frequency channel and the second radio frequency channel may be searched in parallel, thereby saving the search time.

Further, in response to detecting the first device, the processor may utilize the first transceiver to establish a first connection with the first device in accordance with the short-range wireless communication protocol and perform a real-time activity between the electronic device and the first device via the first connection. While the real-time activity is performed via the first transceiver, the processor may utilize the second transceiver to scan a set of radio frequency channels (e.g., a non-real-time activity) for channel interference and determine a radio frequency channel having no interference or an interference below an interference threshold based on the scanning. Furthermore, the processor may notify the first transceiver to utilize the determined radio frequency channel to perform the real-time activity to avoid using congested channels. Thus, the processor may utilize the first transceiver and the second transceiver to perform different activities at the same time, in accordance with the Bluetooth communication protocol In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a block diagram of an example electronic device 100, including a processor 108 to search a first radio frequency channel and a second radio frequency channel via a first transceiver 104 and a second transceiver 106, respectively. Example electronic device 100 is a notebook computer, a multimedia player, a smartphone, a tablet computer, or the like. In an example, electronic device 100 includes an ability to communicate with various other devices over a short-range wireless communication protocol. An example short-range wireless communication protocol is a Bluetooth communication protocol. In other examples, the short-range wireless communication protocol can include a ZigBee® protocol, a Z-Wave® protocol, an IEEE 802.15.4 protocol, a Long-Term Evolution Direct (LTE-D) protocol, or the like.

As shown in FIG. 1A, electronic device 100 includes a network interface device 102. Further, network interface device 102 includes first transceiver 104 to communicate via the short-range wireless communication protocol (e.g., a Bluetooth communication protocol) and second transceiver 106 to communicate via the short-range wireless communication protocol. The term "transceiver" may refer to a device or circuit that is able to both transmit and receive analog and/or digital signals through a transmission medium.

Further, electronic device 100 includes processor 108 connected to network interface device 102. As used herein, the term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. A processor may, for example, include single or multiple cores on a chip, multiple cores across multiple chips, multiple cores across multiple devices, or suitable combinations thereof. A processor may be functional to fetch, decode, and execute instructions as described herein.

During operation, processor 108 may receive a request to search a first device in accordance with the short-range wireless communication protocol. Further, processor 108 may search a first radio frequency (RF) channel via the first transceiver to detect the first device. An example first radio frequency channel is a Bluetooth classic channel. Furthermore, processor 108 may search a second radio frequency channel via second transceiver 106 to detect the first device. An example second radio frequency channel is a Bluetooth low energy channel. In an example, processor 108 performs scanning on the first radio frequency channel and the second radio frequency channel to listen for advertising packets from other devices.

In an example, the first radio frequency channel and the second radio frequency channel are searched in parallel, i.e., the first radio frequency channel and the second radio frequency channel are searched via the first transceiver and the second transceiver, respectively, during a same scan interval (e.g., a first scan interval as shown in FIG. 1A). The term "parallel" may refer to two events occurring at a same time or a portion of the two events occurring at the same time (i.e., the two events occurring at an overlapping period of time). For example, when a user tries to search the first device, which may be compatible with the Bluetooth communication protocol, processor 108 may instruct first transceiver 104 to search Bluetooth classic channels (e.g., discovery or scan may occur on 32 radio frequency channels out of 79 radio frequency channels on which the Bluetooth classic operates) and instruct second transceiver 106 to search Bluetooth low energy channels (e.g., discovery or scan may occur on 3 radio frequency channels out of 40 radio frequency channels on which the Bluetooth low energy operates) to save search time.

Further, in response to detecting the first device, processor 108 may utilize first transceiver 104 to establish a first connection with the first device in accordance with the short-range wireless communication protocol. Further. processor 108 may perform a real-time activity between electronic device 100 and the first device via the first connection. For example, the real-time activity is an audio and/or video call, where data (e.g., real-time transport protocol (RTP) packets) is transferred and/or received in real-time.

Furthermore, while first transceiver 104 performs the real-time activity, processor 108 may utilize second transceiver 106 to:

- scan (e.g., periodically scan) a set of radio frequency channels (e.g., data communication channels) for channel interference,
- determine a radio frequency channel having no interference or an interference below an interference threshold based on the scanning, and
- notify first transceiver 104 to utilize the determined radio frequency channel to perform the real-time activity. Thus, examples described herein may enhance a bandwidth of first transceiver 104 to perform the real-time activity (i.e., the real-time data packet transfer).

Figure 1B:
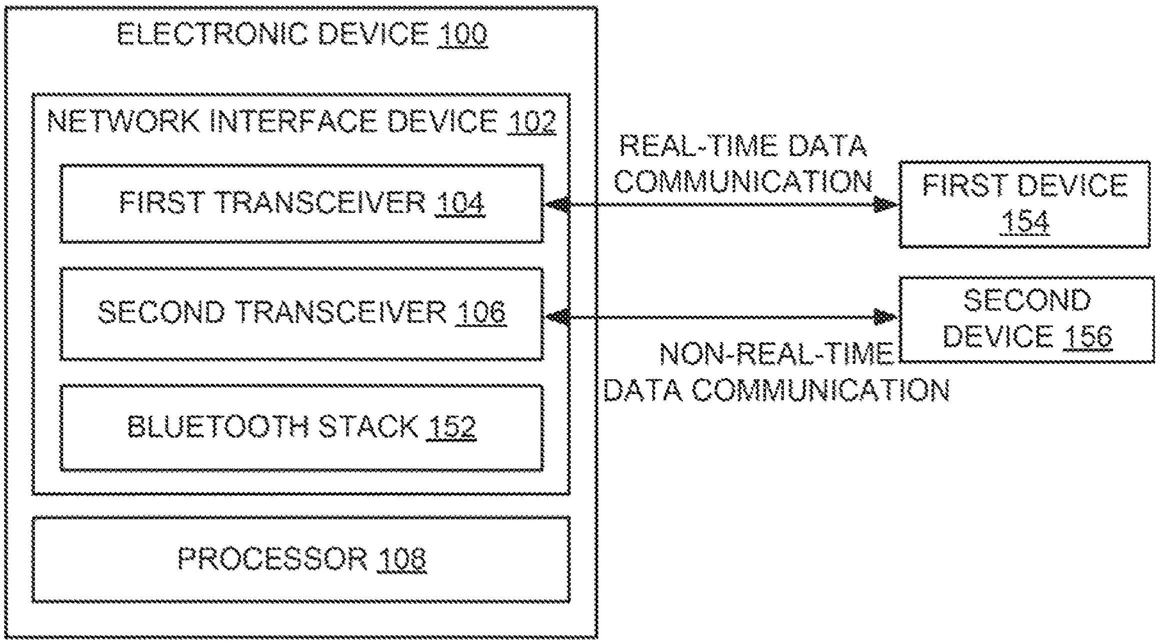
FIG. 1B is a block diagram of the example electronic device of FIG. 1A, depicting additional features.

FIG. 1B is a block diagram of example electronic device 100 of FIG. 1A, depicting additional features. For example, similarly named elements of FIG. 1B may be similar in structure and/or function to elements described with respect to FIG. 1A. During operation, in response to detecting first device 154, processor 108 may utilize first transceiver 104 to establish a first connection with first device 154 in accordance with the short-range wireless communication protocol and perform a first activity between electronic device 100 and first device 154 via the first connection. In an example, the first activity includes a real-time data communication or a real-time activity. Further, first transceiver 104 may include a first media access controller (MAC) and a first physical layer interface to establish the first connection with first device 154.

Further, processor 108 may utilize second transceiver 106 to establish a second connection with a second device 156 in accordance with the short-range wireless communication protocol and perform a second activity between electronic device 100 and second device 156 via the second connection. In an example, the second activity includes a non-real-time data communication or a non-real-time activity. For example, the non-real-time data communication includes a file transfer between electronic device 100 and second device 156 in accordance with a file transfer protocol. In an example, second transceiver 106 includes a second MAC and a second physical layer interface to establish the second connection with second device 156. Further, network interface device 102 includes Bluetooth stack/data 152 (e.g., a program implementation of a Bluetooth protocol stack) to facilitate Bluetooth communication with first device 154 and second device 156, i.e., to exchange a first Bluetooth data packet with first device 154 and to exchange a second Bluetooth data packet with second device 156. In such examples, utilizing first transceiver 104 and second transceiver 106 enables processor 108 to perform the first activity and the second activity at a same time or at an overlapping period of time.

Figure 2A:
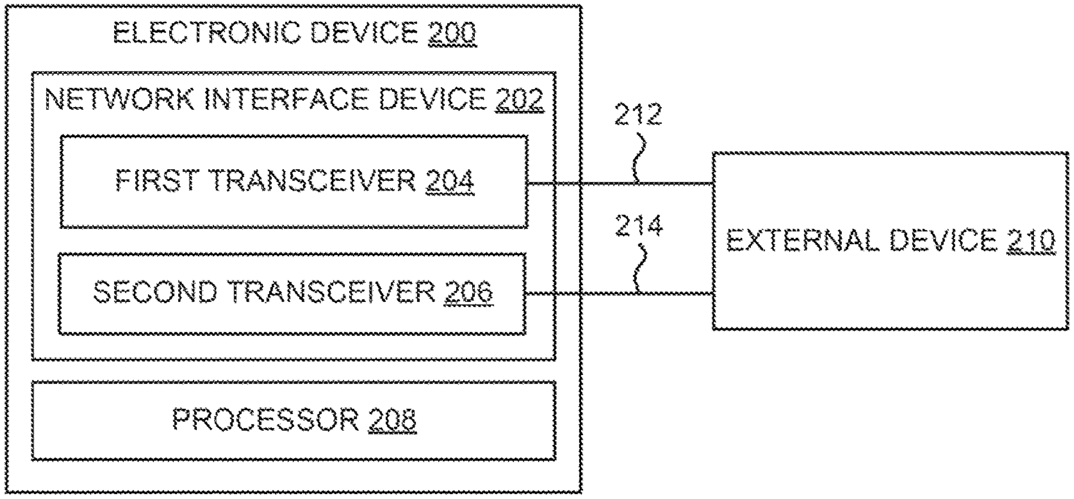
FIG. 2A is a block diagram of an example electronic device, including a processor to perform data communication with an external device via a first wireless channel and a second wireless channel.

FIG. 2A is a block diagram of an example electronic device 200, including a processor 208 to perform data communication with an external device 210 via a first wireless channel 212 and a second wireless channel 214. As shown in FIG. 2A, electronic device 200 may include a network interface device 202 having a first transceiver 204 and a second transceiver 206. In an example, first transceiver 204 communicates with external device 210 via first wireless channel 212 of a short-range wireless communication protocol. An example short-range wireless communication protocol is a Bluetooth communication protocol. Further, second transceiver 206 may communicate with external device 210 via second wireless channel 214 of the short-range wireless communication protocol.

Further, electronic device 200 may include processor 208 connected to network interface device 202. During operation, processor 208 may utilize first transceiver 204 and second transceiver 206 to perform data communication with external device 210 via first wireless channel 212 and second wireless channel 214, respectively.

In an example, processor 208 utilizes first transceiver 204 to communicate a portion of the data between electronic device 200 and external device 210 via first wireless channel 212. Further, processor 208 may utilize second transceiver 206 to communicate a remaining portion of the data between electronic device 200 and external device 210 via second wireless channel 214. In this example, the portion of the data and the remaining portion of the data are communicated in parallel, i.e., at a same time or at an overlapping period of time.

In another example, processor 208 utilizes first transceiver 204 and second transceiver 206 to transmit a first data packet and a second data packet, respectively, to external device 210 in accordance with the short-range wireless communication protocol. In yet another example, processor 208 utilizes first transceiver 204 and second transceiver 206 to receive a third data packet and a fourth data packet, respectively, from external device 210 in accordance with the short-range wireless communication protocol.

Consider an example in which a document including two pages has to be transmitted from electronic device 200 to external device 210 via the Bluetooth communication protocol. In this example, processor 208 instructs first transceiver 204 to transmit data packets associated with a first page and instruct second transceiver 206 to transmit data packets associated with a second page such that the first page and the second page are transmitted in parallel. Thus, examples described herein may enable electronic device 200 to perform the data transfer using first transceiver 204 and second transceiver 206 to reduce a data transfer time. In an example, reducing the data transfer time further enhances the power consumption of electronic device 200. For instance, upon completion of the data transfer, processor 208 and other device components can go into a sleep mode to save the power.

Figure 2B:
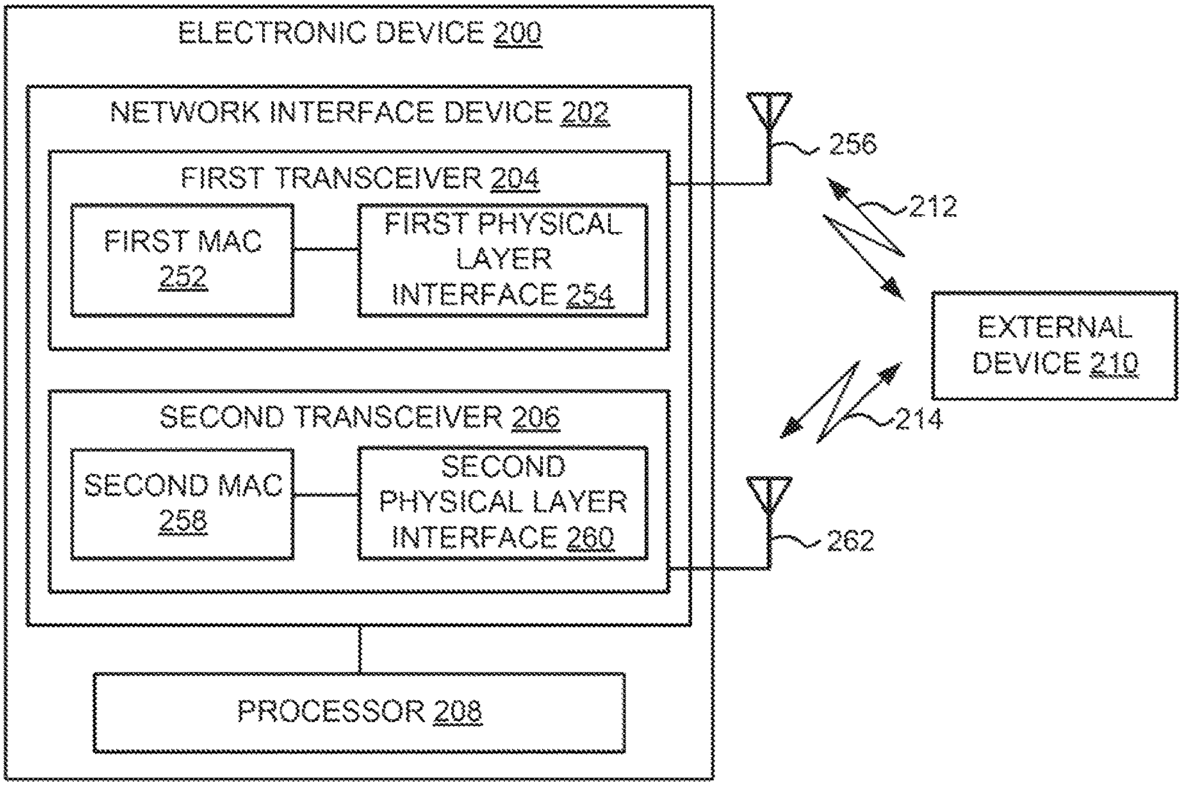
FIG. 2B is a block diagram of the example electronic device of FIG. 2A, depicting additional features.

FIG. 2B is a block diagram of example electronic device 200 of FIG. 2A, depicting additional features. For example, similarly named elements of FIG. 2B may be similar in structure and/or function to elements described with respect to FIG. 2A. As shown in FIG. 2B. first transceiver 204 may include a first MAC 252 and a first physical layer interface 254 to establish the first connection with external device 210 via the short-range wireless communication protocol. Further, second transceiver 206 may include a second MAC 258 and a second physical layer interface 260 to establish the second connection with external device 210 via the short-range wireless communication protocol. In an example, first transceiver 204 and second transceiver 206 are implemented in a single chip (e.g., an integrated circuit). In another example, first transceiver 204 and second transceiver 206 are implemented in separate chips.

First MAC 252 may have a first MAC address to communicate with external device 210 via first physical layer interface 254. Further, second MAC 258 may have a second MAC address to communicate with external device 210 via second physical layer interface 260 to transfer and/or receive data. Further, physical layer interfaces 254 or 260 may send and receive data packets. For example, first physical layer interface 254 is connected to or provided with an antenna 256 to facilitate communication with external device 210 via first wireless channel 212 (e.g., a first data communication channel). Further, second physical layer interface 260 may be connected to or provided with an antenna 262 to facilitate communication with external device 210 via second wireless channel 214 (e.g., a second data communication channel). In an example, first MAC 252 operates between an upper network layer (e.g., a logical link control layer) and first physical layer interface 254. Similarly, second MAC 258 may operate between the upper network layer and second physical layer interface 260. Further, processor 208 may coordinate between first MAC 252 and second MAC 258 to perform the data communication.

Figure 3:
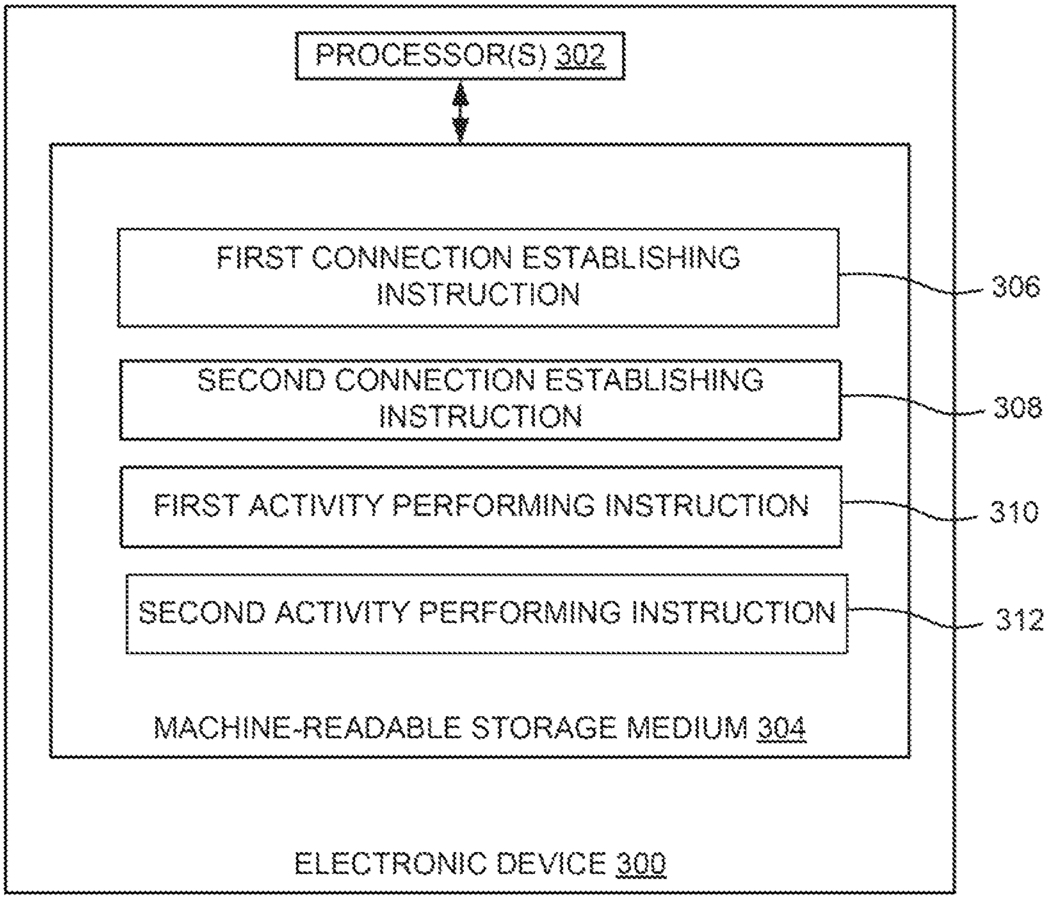
FIG. 3 is a block diagram of an example electronic device including a non-transitory machine-readable storage medium, storing instructions to perform a first activity and a second activity via a first connection and a second connection, respectively.

FIG. 3 is a block diagram of an example electronic device 300 including a non-transitory machine-readable storage medium 304, storing instructions to perform a first activity and a second activity via a first connection and a second connection, respectively. Electronic device 300 includes a processor 302 and machine-readable storage medium 304 communicatively coupled through a system bus. Processor 302 may be any type of central processing unit (CPU), microprocessor, or processing logic that interprets and executes machine-readable instructions stored in machine-readable storage medium 304.

Machine-readable storage medium 304 may be a random-access memory (RAM) or another type of dynamic storage device that may store information and machine-readable instructions that may be executed by processor 302. For example, machine-readable storage medium 304 is synchronous DRAM (SDRAM), double data rate (DDR), Rambus® DRAM (RDRAM), Rambus® RAM, and the like, or storage memory media such as a floppy disk, a hard disk, a CD-ROM, a DVD, a pen drive, and the like. In an example, machine-readable storage medium 304 is a non-transitory machine-readable medium, where the term "non-transitory" does not encompass transitory propagating signals. In another example, machine-readable storage medium 304 is remote but accessible to electronic device 300.

Machine-readable storage medium 304 stores instructions 306, 308, 310, and 312. Instructions 306 may be executed by processor 302 to establish a first connection with a first device via a first transceiver of a wireless module in accordance with a short-range wireless communication protocol. In an example, electronic device 300 operates in a master mode with respect to the first connection. An example short-range wireless communication protocol is a Bluetooth communication protocol. In the master mode, electronic device 300 may search surrounding devices and select a slave device (i.e., the first device) to be connected for the first connection. Further, electronic device 300 can send and receive data, and can also set the MAC address of the slave device connected by default, so that electronic device 300 can find the slave device and connect when the slave device is powered on (e.g., when the Bluetooth of the slave device is turned on).

Instructions 308 may be executed by processor 302 to establish a second connection with a second device via a second transceiver of the wireless module in accordance with the short-range wireless communication protocol. In an example, electronic device 300 operates in a slave mode with respect to the second connection. In the slave mode, electronic device 300 can be searched by a master device (i.e., the second device) and may not actively search the surrounding devices. Upon electronic device 300 is connected to the second device, electronic device 300 can also send and receive data with the second device. In this example, electronic device 300 assumes a master mode for the first connection with the first device and assume a slave mode for the second connection with the second device.

Instructions 310 may be executed by processor 302 to utilize the first transceiver to perform a first activity associated with electronic device 300 in the master mode with respect to the first connection. In an example, instructions to cause the first transceiver to operate electronic device 300 in the master mode include instructions to utilize the first transceiver having a first MAC and a first physical layer interface to perform the first activity associated with electronic device 300 in the master mode with respect to the first connection with the first device. In this example, the first physical layer interface is an interface between the first transceiver and a first wireless channel.

Instructions 312 may be executed by processor 302 to utilize the second transceiver to perform a second activity associated with electronic device 300 in the slave mode with respect to the second connection. In an example, instructions to cause the second transceiver to operate electronic device 300 in the slave mode include instructions to utilize the second transceiver having a second MAC and a second physical layer interface to perform the second activity associated with electronic device 300 in the slave mode with respect to the second connection with the second device. In this example, the second physical layer interface is an interface between the second transceiver and a second wireless channel. Thus, examples described herein may utilize the first transceiver (e.g., a first Bluetooth transceiver) and the second transceiver (e.g., a second Bluetooth transceiver) to perform master mode activities and slave mode activities, respectively, thereby reducing a delay in the data transfer associated with the master mode activities and slave mode activities, and also enhance a power consumption of electronic device 300.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have." and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
a network interface device including:
a first transceiver to communicate via a short-range wireless communication protocol; and
a second transceiver to communicate via the short-range wireless communication protocol; and
a processor connected to the network interface device, wherein the processor is to:
receive a request to search a first device in accordance with the short-range wireless communication protocol;
search a first radio frequency channel via the first transceiver to detect the first device; and
search a second radio frequency channel via the second transceiver to detect the first device, wherein the first radio frequency channel and the second radio frequency channel are searched in parallel.

2. The electronic device of claim 1, wherein the short-range wireless communication protocol is a Bluetooth communication protocol.

3. The electronic device of claim 1, wherein the first radio frequency channel is a Bluetooth classic channel, and wherein the second radio frequency channel is a Bluetooth low energy channel.

4. The electronic device of claim 1, wherein, in response to detecting the first device, the processor is to:
utilize the first transceiver to:
establish a first connection with the first device in accordance with the short-range wireless communication protocol; and
perform a first activity between the electronic device and the first device via the first connection; and
utilize the second transceiver to:
establish a second connection with a second device in accordance with the short-range wireless communication protocol; and
perform a second activity between the electronic device and the second device via the second connection.

5. The electronic device of claim 4, wherein the first activity comprises a real-time data communication and the second activity comprises a non-real-time data communication.

6. The electronic device of claim 1, wherein, in response to detecting the first device, the processor is to:
utilize the first transceiver to:
establish a first connection with the first device in accordance with the short-range wireless communication protocol; and
perform a real-time activity between the electronic device and the first device via the first connection;
utilize the second transceiver to:
scan a set of radio frequency channels for channel interference while the first transceiver performs the real-time activity; and
determine a radio frequency channel having no interference or an interference below an interference threshold based on the scanning; and
notify the first transceiver to utilize the determined radio frequency channel to perform the real-time activity.

7. An electronic device comprising:
a network interface device including:
a first transceiver to communicate with an external device via a first wireless channel of a short-range wireless communication protocol; and
a second transceiver to communicate with the external device via a second wireless channel of the short-range wireless communication protocol; and
a processor connected to the network interface device to:
utilize the first transceiver and the second transceiver to perform data communication with the external device via the first wireless channel and the second wireless channel, respectively.

8. The electronic device of claim 7, wherein the processor is to:
utilize the first transceiver to communicate a portion of the data between the electronic device and the external device via the first wireless channel; and
utilize the second transceiver to communicate a remaining portion of the data between the electronic device and the external device via the second wireless channel, wherein the portion of the data and the remaining portion of the data are communicated in parallel.

9. The electronic device of claim 7, wherein the processor is to:
utilize the first transceiver and the second transceiver to transmit a first data packet and a second data packet, respectively, to the external device in accordance with the short-range wireless communication protocol; or
utilize the first transceiver and the second transceiver to receive a third data packet and a fourth data packet, respectively, from the external device in accordance with the short-range wireless communication protocol.

10. The electronic device of claim 7, wherein the first transceiver comprises a first media access controller (MAC) and a first physical layer interface to establish the first connection with the external device via the short-range wireless communication protocol, and wherein the second transceiver comprises a second MAC and a second physical layer interface to establish the second connection with the external device via the short-range wireless communication protocol.

11. The electronic device of claim 7, wherein the short-range wireless communication protocol is a Bluetooth communication protocol.

12. A non-transitory computer-readable storage medium encoded with instructions that, when executed by a processor of an electronic device, cause the processor to:
establish a first connection with a first device via a first transceiver of a wireless module in accordance with a short-range wireless communication protocol, the electronic device operating in a master mode with respect to the first connection;
establish a second connection with a second device via a second transceiver of the wireless module in accordance with the short-range wireless communication protocol, the electronic device operating in a slave mode with respect to the second connection;
utilize the first transceiver to perform a first activity associated with the electronic device in the master mode with respect to the first connection; and
utilize the second transceiver to perform a second activity associated with the electronic device in the slave mode with respect to the second connection.

13. The non-transitory computer-readable storage medium of claim 12, wherein the short-range wireless communication protocol is a Bluetooth communication protocol.

14. The non-transitory computer-readable storage medium of claim 12, wherein instructions to cause the first transceiver to operate the electronic device in the master mode comprise instructions to:

utilize the first transceiver having a first media access controller (MAC) and a first physical layer interface to perform the first activity associated with the electronic device in the master mode with respect to the first connection with the first device, wherein the first physical layer interface is an interface between the first transceiver and a first wireless channel.

15. The non-transitory computer-readable storage medium of claim 12, wherein instructions to cause the second transceiver to operate the electronic device in the slave mode comprise instructions to:

utilize the second transceiver having a second media access controller (MAC) and a second physical layer interface to perform the second activity associated with the electronic device in the slave mode with respect to the second connection with the second device, wherein the second physical layer interface is an interface between the second transceiver and a second wireless channel.

* * * * *